(12) United States Patent
Tinnell

(10) Patent No.: US 6,287,061 B1
(45) Date of Patent: Sep. 11, 2001

(54) FLATBED VEHICLE TRANSPORT SYSTEM

(76) Inventor: Randy Tinnell, P.O. Box 406, Whitewood, SD (US) 57793

( * ) Notice: Subject to any disclaimer, the term of this patent is extended or adjusted under 35 U.S.C. 154(b) by 0 days.

(21) Appl. No.: 09/526,103

(22) Filed: Mar. 16, 2000

(51) Int. Cl.[7] .................................................... B60P 3/08
(52) U.S. Cl. ............................ 410/26; 410/24; 410/28.1
(58) Field of Search ................................ 410/4, 24, 26, 410/27, 28.1, 29.1; 296/3, 43; 105/380, 390

(56) References Cited

U.S. PATENT DOCUMENTS

| | | | |
|---|---|---|---|
| 1,282,764 | * | 10/1918 | Daly .......................................... 410/10 |
| 2,883,231 | * | 4/1959 | Dawson ................................ 410/28.1 |
| 4,089,555 | * | 5/1978 | Allen ..................................... 296/43 X |
| 4,343,401 | * | 8/1982 | Paulyson .............................. 410/26 X |
| 4,898,418 | * | 2/1990 | Lind, Sr. et al. .................... 410/24 X |
| 5,106,246 | * | 4/1992 | Chance ..................................... 410/26 |
| 5,213,458 | * | 5/1993 | Preller et al. ........................... 410/26 |
| 5,344,266 | * | 9/1994 | Kolb ......................................... 410/26 |
| 5,427,485 | * | 6/1995 | Henderson et al. .................... 410/26 |
| 5,806,905 | * | 9/1998 | Moore ....................................... 296/3 |
| 5,924,248 | * | 7/1999 | Cox et al. ........................... 410/24 X |
| 6,010,285 | * | 1/2000 | Cox et al. ............................... 410/26 |

* cited by examiner

Primary Examiner—Stephen T. Gordon
(74) Attorney, Agent, or Firm—Michael S. Neustel

(57) ABSTRACT

A flatbed vehicle transport system for of the support member, cross members and ramp members. The inventive device includes a plurality of support members that are positionable within apertures within a trailer, a plurality of cross members insertable into the support members, a plurality of ramp members attached across the cross members, and a loading ramp for loading vehicles upon the trailer. A plurality of chains are preferably secured to one or more support members to prevent longitudinal movement of the structure while loaded.

16 Claims, 5 Drawing Sheets

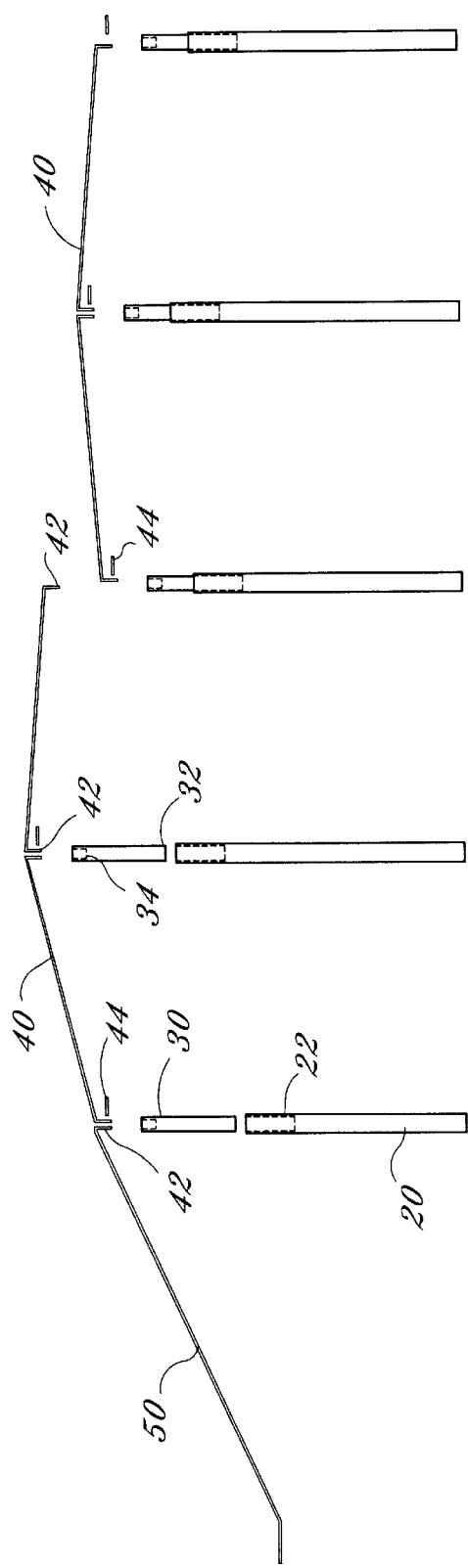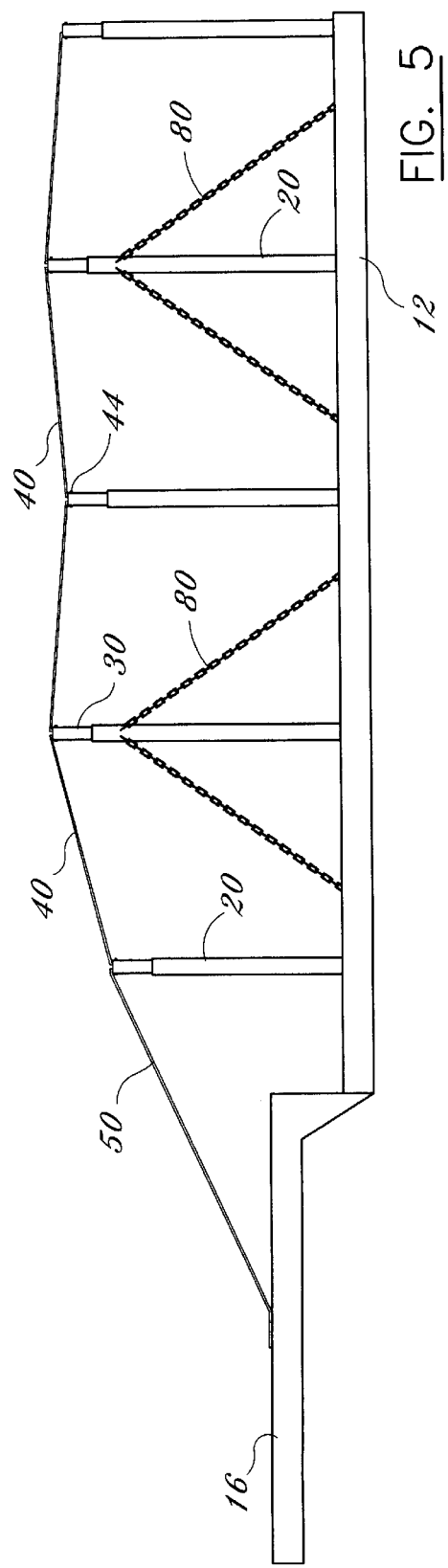

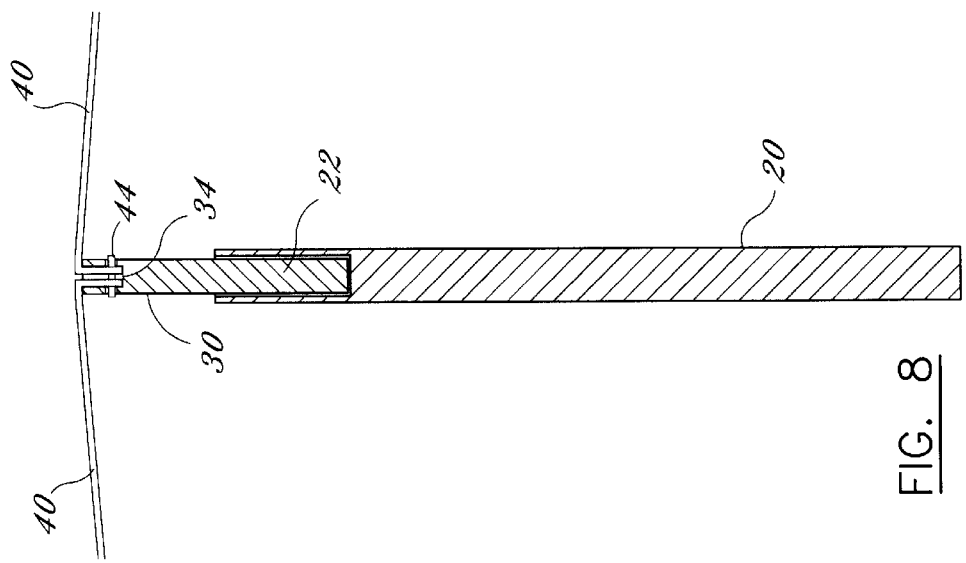
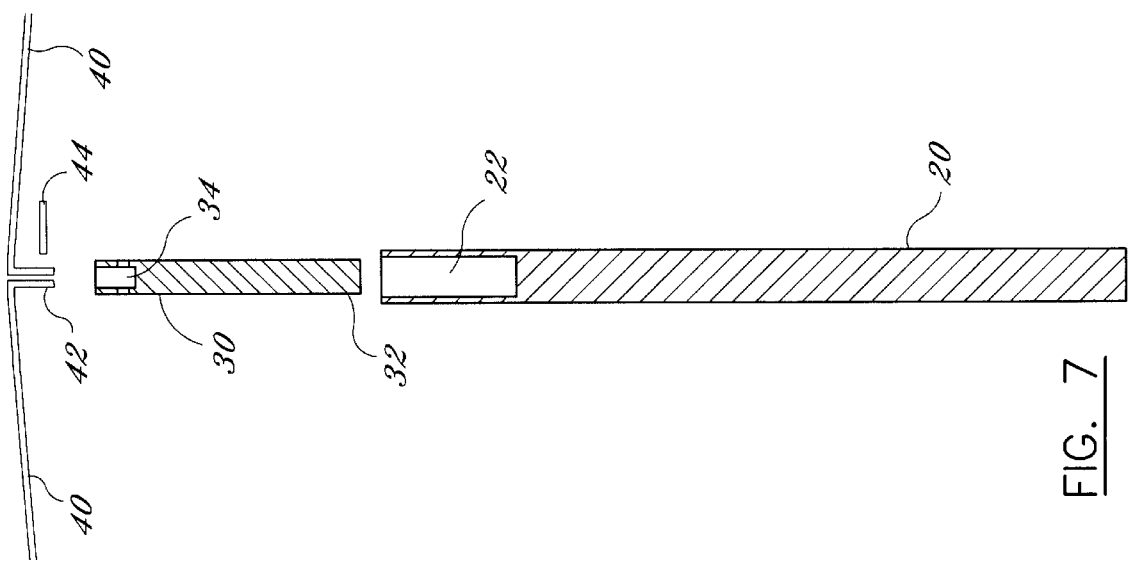

FLATBED VEHICLE TRANSPORT SYSTEM

BACKGROUND OF THE INVENTION

1. Field of the Invention

The present invention relates generally to trailer devices and more specifically it relates to a flatbed vehicle transport system for increasing the total number of vehicles that can be transported upon a conventional flatbed trailer.

2. Description of the Prior Art

Flatbed trailers have been in use for years. Typically, a flatbed trailer includes a frame structure, an elongated deck, an upper deck, a plurality of wheels rotatably supporting the frame structure, and a hitch portion for allowing attachment to a tractor.

Flatbed trailers are acceptable for hauling large objects. However, when utilized to transport vehicles, such as cars and pickups, flatbed trailers are generally capable of only transporting three vehicles. It is very inefficient and costly for the driver of a semi-tractor to transport only three vehicles when considering fuel costs and repairs.

Examples of patented vehicle trailers include U.S. Pat. No. 5,415,505 to Halpin et al.; U.S. Pat. No. 4,343,401 to Paulyson; U.S. Pat. No. 4,738,575 to Blodgett et al.; U.S. Pat. No. 5,051,046 to Oren; U.S. Pat. No. 5,253,975 to Takaguchi; U.S. Pat. No. 5,286,149 to Seay et al.; U.S. Pat. No. 5,536,132 to Knott; U.S. Pat. No. 4,701,086 to Thomdyke which are all illustrative of such prior art.

While these devices may be suitable for the particular purpose to which they address, they are not as suitable for increasing the total number of vehicles that can be transported upon a conventional flatbed trailer. Conventional flatbed trailers are not suited for transporting a plurality of smaller vehicles such as cars and pickups.

In these respects, the flatbed vehicle transport system according to the present invention substantially departs from the conventional concepts and designs of the prior art, and in so doing provides an apparatus primarily developed for the purpose of increasing the total number of vehicles that can be transported upon a conventional flatbed trailer.

SUMMARY OF THE INVENTION

In view of the foregoing disadvantages inherent in the known types of trailers now present in the prior art, the present invention provides a new flatbed vehicle transport system construction wherein the same can be utilized for increasing the total number of vehicles that can be transported upon a conventional flatbed trailer.

The general purpose of the present invention, which will be described subsequently in greater detail, is to provide a new flatbed vehicle transport system that has many of the advantages of the trailers mentioned heretofore and many novel features that result in a new flatbed vehicle transport system which is not anticipated, rendered obvious, suggested, or even implied by any of the prior art trailers, either alone or in any combination thereof.

To attain this, the present invention generally comprises a plurality of support members that are positionable within apertures within a trailer, a plurality of cross members insertable into the support members, a plurality of ramp members attached across the cross members, and a loading ramp for loading vehicles upon the trailer. A plurality of chains are preferably secured to one or more support members to prevent longitudinal movement of the structure while loaded.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a flatbed vehicle transport system that will overcome the shortcomings of the prior art devices.

A second object is to provide a flatbed vehicle transport system for increasing the total number of vehicles that can be transported upon a conventional flatbed trailer.

Another object is to provide a flatbed vehicle transport system that converts a conventional flatbed trailer into a multi-layered vehicle transport trailer.

An additional object is to provide a flatbed vehicle transport system that can be easily disassembled and assembled upon a conventional flatbed trailer.

A further object is to provide a flatbed vehicle transport system that allows a conventional flatbed trailer to be utilized as a conventional step-deck and an auto transport.

Another object is to provide a flatbed vehicle transport system that can be disassembled into a compact structure and stored under the flatbed trailer out of sight.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 4 is an exploded side view of the present invention.

FIG. 5 is a side view of the present invention attached to a trailer.

FIG. 7 is an exploded side cutaway view of the support member, cross members and ramp members.

FIG. 8 is a side cutaway view of the support member, cross members and ramp members.

DESCRIPTION OF THE PREFERRED EMBODIMENT

Figure 1:
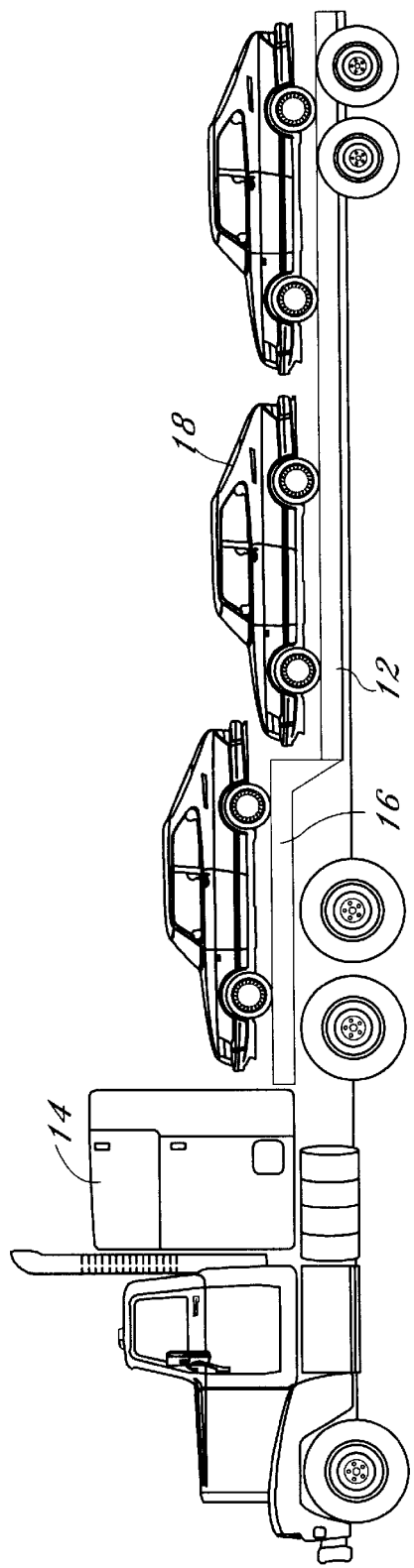
FIG. 1 is a side view of a convention flatbed trailer attached to a semi-tractor supporting three vehicles.

Turning now descriptively to the drawings, in which similar reference characters denote similar elements throughout the several views, FIGS. 1 through 8 illustrate a flatbed vehicle transport system 10, which comprises a plurality of support members 20 that are positionable within apertures 14 within a trailer 12, a plurality of cross members 30 insertable into the support members 20, a plurality of ramp members 40 attached across the cross members 30, and a loading ramp for loading vehicles 18 upon the trailer 12. A plurality of chains 80 are preferably secured to one or more support members 20 to prevent longitudinal movement of the structure while loaded.

Figure 2:
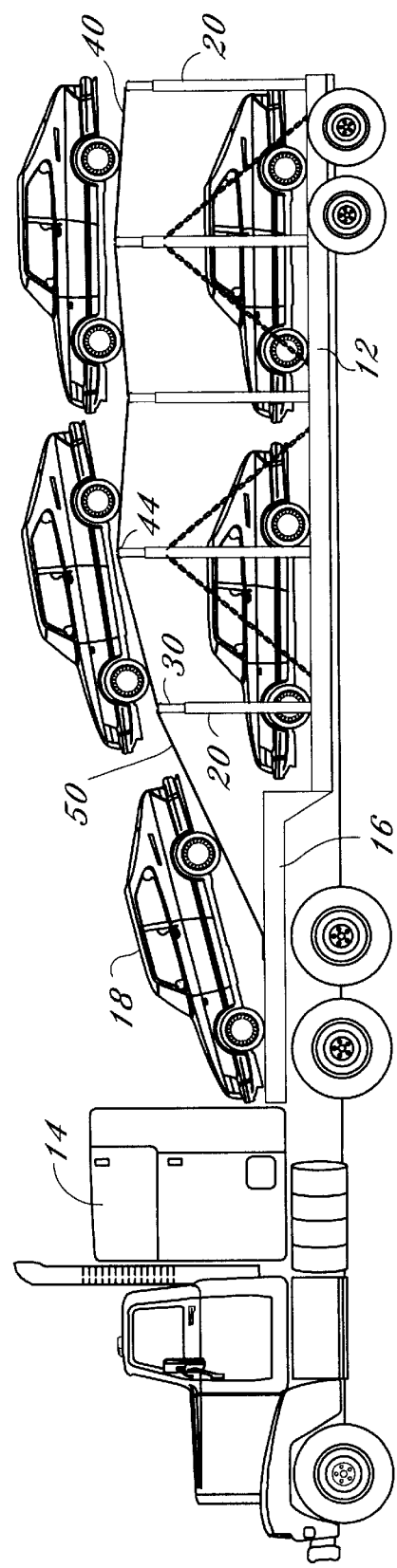
FIG. 2 is a side view of the present invention attached to a trailer supporting five vehicles.

As shown in FIGS. 1, 2, 5 and 6 of the drawings, a conventional trailer 12 includes a plurality of wheels along with a platform 16 raised above the main portion of the conventional trailer 12. The trailer 12 also includes a plurality of apertures 14 along the sides of the trailer 12 designed for receiving stakes and other structures. The trailer 12 is designed for being transported by a conventional tractor 15 as shown in FIGS. 1 and 2 of the drawings.

As shown in FIGS. 2 through 6 of the drawings, a plurality of support members 20 are provided having a lower end and an upper end. The lower end of the support members 20 is designed to snugly fit within the apertures 14 within the trailer 12. The upper end of the support members 20 includes an upper opening 22 for receiving insert members 32 from the cross members 30. The support members 20 may be comprised of any well-known material and may have any well-known shape. The support members 20 may be tubular or of a solid construction.

Figure 3:
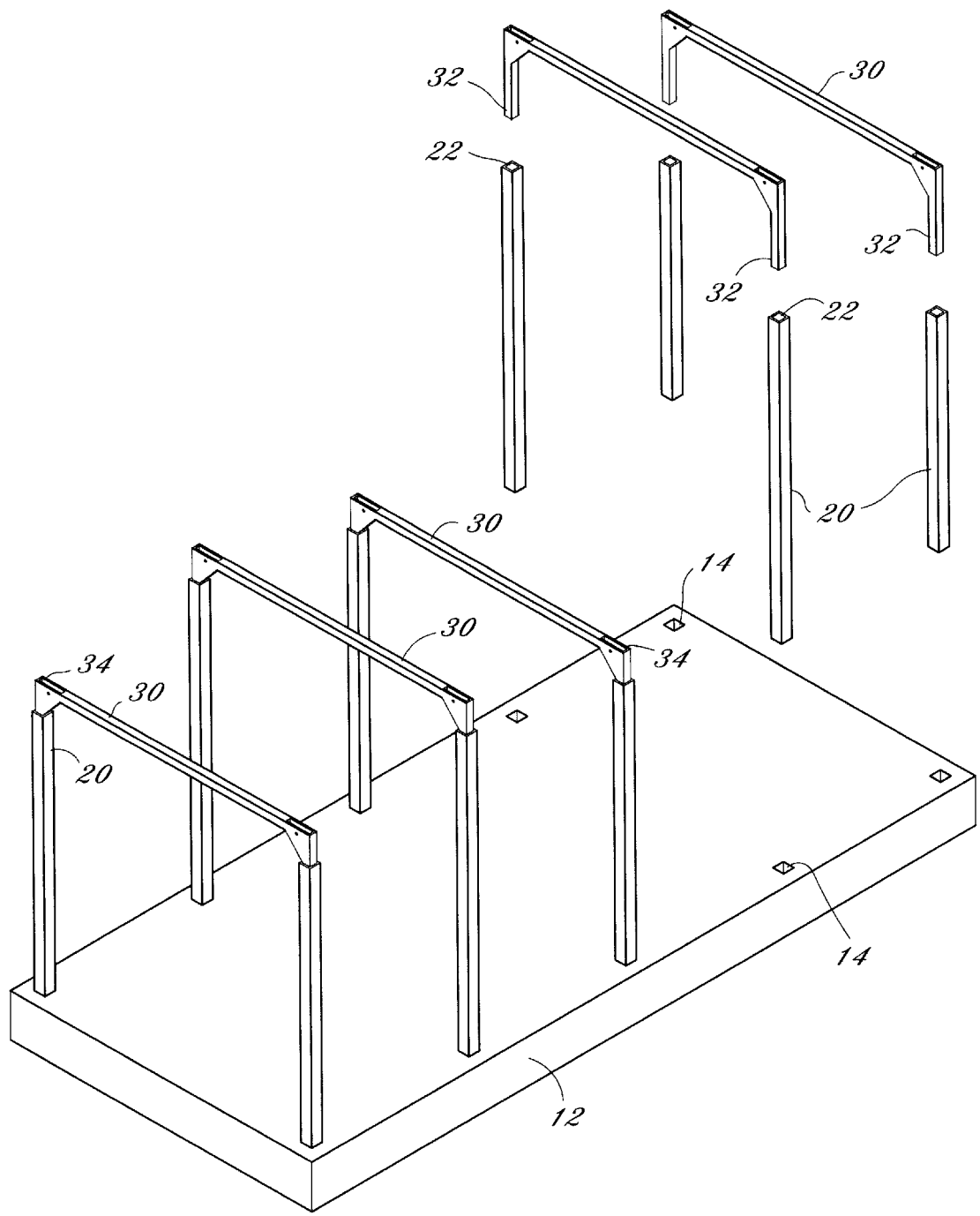
FIG. 3 is an exploded perspective view of the present invention above a trailer.

As best shown in FIG. 3 of the drawings, a plurality of cross members 30 are provided that extend between a pair of the support members 20 on opposing sides of the trailer 12. The cross members 30 each include a pair of insert members 32 that are snugly positioned within the upper opening 22 of each of the support members 20 as best shown in FIG. 8 of the drawings. As best shown in FIGS. 3 and 7 of the drawings, each of the cross members 30 includes a pair of opposing slots 34 into the upper portion of the cross members 30 for receiving the lip portions 42 of the ramp members 40. The cross members 30 may be comprised of any well-known material and may have any well-known structure and shape. The cross members 30 may be retained within the support members 20 by an conventional securing device such as conventional fasteners 44.

Figure 6:
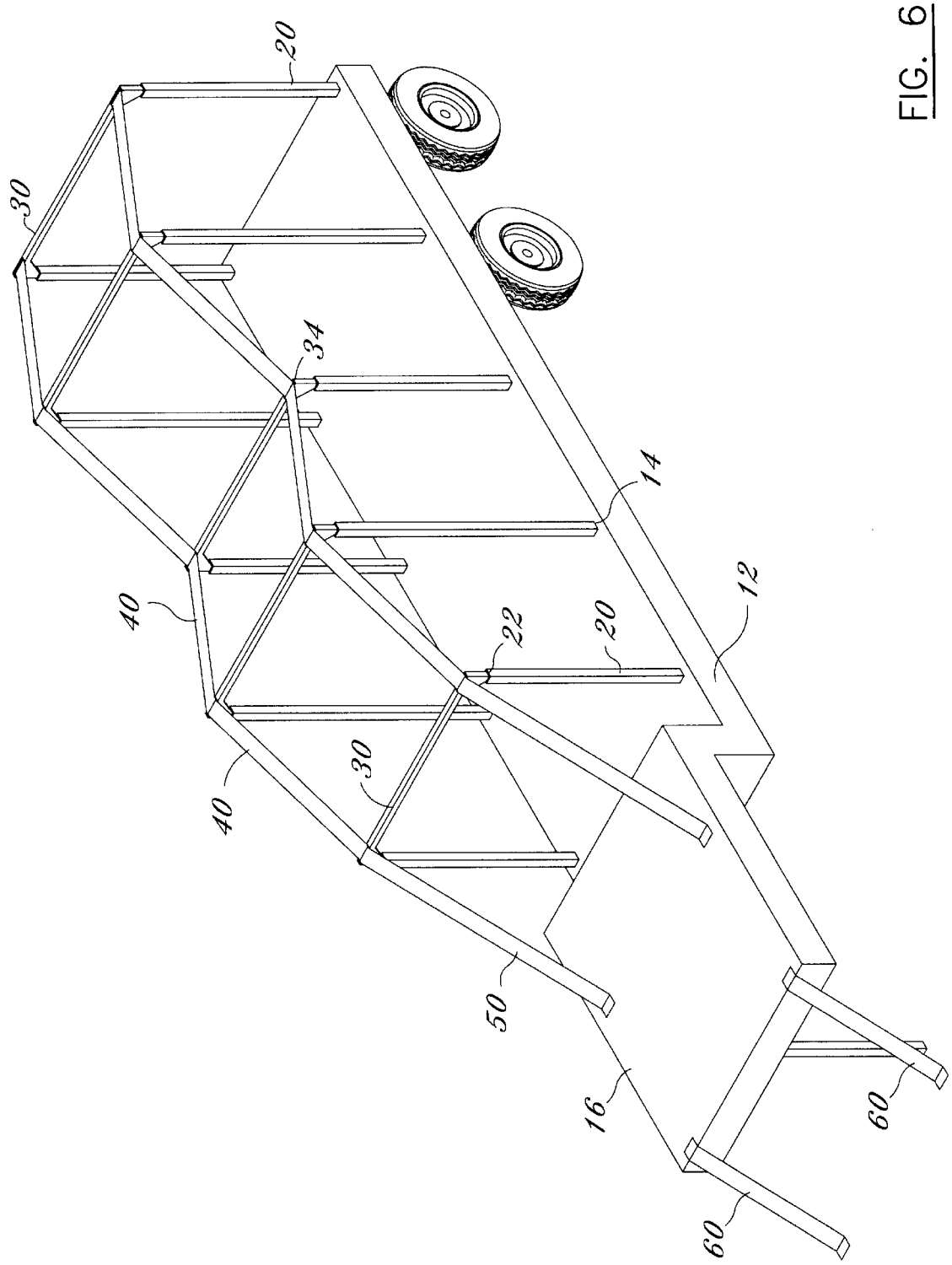
FIG. 6 is an upper perspective view of the present invention attached to a trailer.

As best shown in FIGS. 2, 5 and 6 of the drawings, a plurality of ramp members 40 are positioned upon the plurality of cross members 30. The plurality of ramp members 40 each include lip portions 42 at the opposing ends thereof for inserting into the slots 34 of the cross members 30. A conventional securing apparatus may secure the lip portions 42 within the slots 34 of the cross members 30 such as conventional fasteners 44.

As best shown in FIG. 6 of the drawings, a pair of front ramps 50 are attached to the platform 16 of the trailer 12 and extend upwardly to the pair of support members 20 for allowing loading of vehicles 18 upon the ramp members 40. A pair of loading ramps 60 are provided that are positionable upon the ground surface and the platform 16 while the tractor 15 is disconnected for allowing loading of vehicles 18 onto the trailer 12.

As best shown in FIG. 5 of the drawings, a plurality of chains 80 are attached between the trailer 12 and the support members 20 for providing horizontal support to the support members 20. The chains 80 are preferably attached in opposition to one another for providing maximum stability o the support members 20.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A flatbed vehicle transport system, comprising:
   a plurality of support members having a lower end and an upper end, wherein said lower end is positionable within apertures of a trailer;
   a plurality of cross members attachable to said upper end of each of said plurality of support members; and
   a plurality of ramp members attachable to said plurality of cross members for receiving and supporting wheels of a vehicle;
   wherein said cross members include a pair of slots extending into an upper surface of said cross members and said plurality of ramp members each include a pair of lip portions at opposing ends for insertion into said slots of said cross members.

2. The flatbed vehicle transport system of claim 1, wherein said lip portions are retained within said slots by at least one fastener.

3. The flatbed vehicle transport system of claim 1, including a pair of front ramps for extending between a platform of a trailer and one of said cross members.

4. The flatbed vehicle transport system of claim 1, including a pair of loading ramps extendable between a ground surface and a platform of a trailer.

5. The flatbed vehicle transport system of claim 1, including at least one stabilizer device for stabilizing horizontal movement of said plurality of support members.

6. The flatbed vehicle transport system of claim 5, wherein said at least one stabilizer device is comprised of a length of chain.

7. The flatbed vehicle transport system of claim 1, wherein:
   said plurality of support members each include an upper opening; and
   said plurality of cross members each include a pair of opposing insert members that are positionable within each said upper opening of said plurality of support members.

8. The flatbed vehicle transport system of claim 7, wherein said plurality of cross members are retained within each said upper opening by at least one fastener.

9. A flatbed vehicle transport system, comprising:

a plurality of support members having a lower end and an upper end, wherein said lower end is positionable within apertures of a trailer;

a plurality of cross members attachable to said upper end of each of said plurality of support members; and a plurality of ramp members attachable to said plurality of cross members for receiving and supporting wheels of a vehicle;

wherein said cross members include a plurality of slots extending into an upper surface of said cross members and said plurality of ramp members each include a plurality of lip portions at opposing ends for insertion into said slots of said cross members.

10. The flatbed vehicle transport system of claim 9, wherein said lip portions are retained within said slots by at least one fastener.

11. The flatbed vehicle transport system of claim 9, including a pair of front ramps for extending between a platform of a trailer and one of said cross members.

12. The flatbed vehicle transport system of claim 9, including a pair of loading ramps extendable between a ground surface and a platform of a trailer.

13. The flatbed vehicle transport system of claim 9, including at least one stabilizer device for stabilizing horizontal movement of said plurality of support members.

14. The flatbed vehicle transport system of claim 13, wherein said at least one stabilizer device is comprised of a length of chain.

15. The flatbed vehicle transport system of claim 9, wherein:

said plurality of support members each include an upper opening; and said plurality of cross members each include a pair of opposing insert members that are positionable within each said upper opening of said plurality of support members.

16. The flatbed vehicle transport system of claim 15, wherein said plurality of cross members are retained within each said upper opening by at least one fastener.

* * * * *